United States Patent Office 3,093,620
Patented June 11, 1963

3,093,620
5-ALKENYL-2-NORBORNENES AND SULFUR-CURABLE ELASTOMERIC COPOLYMERS THEREOF
Edward Karcher Gladding, New Castle, and Donald Nellis Robinson, Wilmington, Del., assignors to E. I. du Pont de Nemours and Company, Wilmington, Del., a corporation of Delaware
No Drawing. Filed Mar. 29, 1960, Ser. No. 18,265
11 Claims. (Cl. 260—79.5)

This invention is directed to new hydrocarbon polymers which may be readily sulfur-cured to form highly useful elastomers.

Alpha olefins, such as ethylene and propylene, are very important polymer intermediates because they are commercially available in great volume at very low cost. It is known that they can be copolymerized to give products ranging in form from low molecular weight oils to high molecular weight solids.

Unfortunately, these copolymers are not convenient to cure. Unlike natural rubber, GRS, or butyl rubber, they contain essentially no ethylenic unsaturation which can be sulfur cured; thus, the curing procedures familiar to the trade cannot be used. Alternative methods for curing, such as the use of high energy radiation or the employment of organic peroxides, are more expensive and may limit the choice of antioxidants which can be incorporated in the uncured elastomer.

It is known that hydrocarbon copolymers having open-chain diolefin monomer units incorporated therein can be sulfur cured. However, these copolymers have either required difficulty accessible diolefins or they have been difficult to prepare in acceptable yields. Some of the diolefins interfere with the polymerization by poisoning the catalyst or lowering its productivity. Many of the diolefins are not copolymerized efficiently into the copolymer. The unreacted diolefin monomer then presents recovery and recycling problems which are inconvenient and economically undesirable.

It is known that sulfur-curable elastomers can be made by copolymerizing ethylene, propylene, and dicyclopentadiene. This copolymer, unfortunately, cures too slowly with sulfur to be entirely satisfactory. A suitable state of cure can be obtained, but an uneconomically large proportion of dicyclopentadiene monomer units must then be present in the copolymer or an undesirably long cure time must then be used. Also, undesirably large amounts of sulfur must be used and this causes the vulcanizates to have poor heat aging properties.

It is, therefore, an object of this invention to provide a novel class of 5-alkenyl-2-norbornenes. It is another object of this invention to provide a new hydrocarbon elastomer. It is a further object of the present invention to provide a new hydrocarbon elastomer which is readily sulfur-curable. It is a still further object to provide a process for preparing these new elastomers and to provide a process for curing same. These and other objects will become apparent in the following description and claims.

More specifically, the present invention is directed to 5-alkenyl-2-norbornenes having the structure

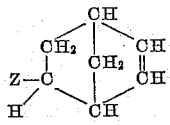

wherein Z is a monovalent alkenyl radical, the carbon to carbon double bond of said radical being internal.

The present invention is also directed to a rubbery copolymer of ethylene, at least one alpha olefin having the structure R—CH=CH$_2$ where R is a C$_1$—C$_8$ alkyl radical, and a 5-alkenyl substituted-2-norbornene, said copolymer having an iodine number between 5 and 60 and containing at least about 20% ethylene units by weight and at least about 25% of said alpha olefin units by weight.

The novel 5-alkenyl-2-norbornenes of this invention are significantly useful as comonomers in the preparation of hydrocarbon elastomers, which elastomers are readily sulfur cured as hereinafter described.

A representative Grignard reaction for the preparation of some of the 5-alkenyl-2-norbornenes of the present invention includes the synthesis of 5-(2'-ethyl-2'-butenyl)-2-norbornene from the reaction of diethyl ketone with 5-bromomethylnorbornene Grignard reagent and dehydrating the resulting alcohol. The following representative 5-alkenyl-2-norbornenes are made by the Diels-Alder method from the corresponding diolefin and cyclopentadiene: 5-(1'-butenyl)-2-norbornene; 5-(1'-propenyl)-2-norbornene.

The copolymers made according to the present process are readily sulfur cured; a satisfactory modulus being quickly attained. When, however, dicyclopentadiene is substituted for the presently employed diolefins, the copolymers obtained are slower curing.

The novel copolymers of the present invention can be prepared by contacting ethylene, at least one alpha olefin as described, and a 5-alkenyl substituted-2-norbornene in solution in specific inert solvents with specific coordination catalysts, as hereinafter described, at temperatures between about 20° C. and 100° C., at atmospheric or superatmospheric pressure; and, in the absence of oxygen, water vapor, and carbon dioxide. The copolymers obtained as a result of this process are rubbery, high molecular weight elastomers capable of being sulfur cured to form elastomeric vulcanizates.

Represenative examples of the useful monoolefins having the structure R—CH=CH$_2$ are: propylene; 1-butene; 4-methyl-1-pentene; 1-pentene; 1-hexene; 1-heptene; 1-octene; 1-nonene; 1-decene; 5-methyl-1-nonene; 5,5-dimethyl-1-octene; 4-methyl-1-hexene; 4,4-dimethyl-1-pentene; 5-methyl-1-hexene; 4-methyl-1-heptene; 5-methyl-1-heptene; 6-methyl-1-heptene; 4,4-dimethyl-1-hexene; and 5,6,6-trimethyl-1-heptene.

The hydrocarbon diolefin useful in the present invention is a 5-alkenyl substituted-2-norbornene.

The 5-alkenyl-2-norbornenes may be described by the following formula $$\begin{array}{c} R \\ | \\ R \quad 1C \\ R-C6 \quad | \quad 2C-H \\ | \quad 7CH_2 \; \| \\ Z-C5 \quad | \quad 3C-H \\ | \quad 4C \\ R \quad | \\ R \end{array}$$

wherein each R represents hydrogen or a monovalent alkyl radical of from 1 to 6 carbon atoms; Z represents a monovalent alkenyl radical, the carbon-carbon double bond therein being internal.

A wide variety of 5-alkenyl-2-norbornenes can be made for use in the present invention by the Diels-Alder addition of both conjugated and non-conjugated hydrocarbon dienes to cyclopentadienes having the formula $$\begin{array}{c} H-C\text{------}C-H \\ \| \quad \quad \| \\ R-C \quad \quad C-R \\ \diagdown \quad \diagup \\ C \\ \diagup \quad \diagdown \\ H \quad \quad H \end{array}$$

in which R is as heretofore described; the R's can be the same or different. The reaction is carried out at autogenous pressure in a closed inert (e.g. glass and stainless steel) container at temperatures ranging between about 150 to 250° C., preferably 175–225° C., for times ranging between about 2 to 24 hours. It is preferred that an addition polymerization inhibitor (e.g. hydroquinone) be present. Representative syntheses of this type are: the formation of 5-(2'-butenyl)-2-norbornene from cyclopentadiene and 1,4-hexadiene; the preparation of 5-(1'-propenyl)-2-norbornene from cyclopentadiene and 1,3-pentadiene (often called piperylene).

The reaction of cyclopentadiene with conjugated dienes having the structure R''—CH=CH—CH=CH—R''', where R'' and R''' are alkyl radicals, can be used to prepare 6-alkyl-5-alkenyl-2-norbornenes having the structures

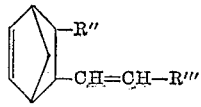

and

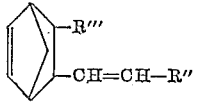

The reaction of cyclopentadiene with unsymmetrical non-conjugated dienes of the structure $$CH_2=CH-CH_2-CH=CH-Q$$

where Q is an alkyl radical will lead to 5-(2-alkenyl)-2-norbornenes

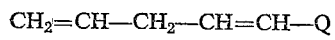

The reaction of cyclopentadiene with conjugated dienes of the formula $CH_2=CH-CH=CH-Q'$, where Q' is an alkyl radical, will produce:

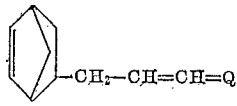

The 2-norbornenes having the structures

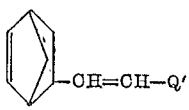

and

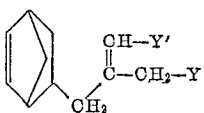

where Y is H or alkyl and Y' is alkyl, are made by reacting the Grignard reagent of 5-bromomethyl-2-norbornene in ether with ketones having the structure

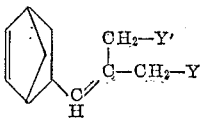

and dehydrating the resulting tertiary carbinol in refluxing toluene in the presence of anhydrous copper sulfate.

Representative examples of the heretofore described 2-norbornenes include:

5-(2'-ethyl-2'-butenyl)-2-norbornene;
5-(2'-ethyl-1'-butenyl)-2-norbornene;
5-(2'-methyl-1'-propenyl)-2-norbornene;
5-(2'-propyl-2'-pentenyl)-2-norbornene;
5-(2'-hexyl-2'-undecenyl)-2-norbornene;
5-(2'-nonyl-2'-heptenyl)-2-norbornene;
5-(2'-butyl-1'-pentenyl)-2-norbornene;
5-(2'-pentyl-1'-octenyl)-2-norbornene;
5-(2'-heptyl-1'-undecenyl)-2-norbornene;
5-(2'-methyl-2'-butenyl)-2-norbornene;
5-(2'-methyl-2'-decenyl)-2-norbornene;
5-(2'-methyl-1'-butenyl)-2-norbornene;
5-(2'-methyl-1'-hexenyl)-2-norbornene;
5-(2'-methyl-1'-undecenyl)-2-norbornene;
5-(2'-hexyl-2'-butenyl)-2-norbornene;
5-(2'-octyl-2'-butenyl)-2-norbornene;
5-(2'-ethyl-2'-decenyl)-2-norbornene; and
5-(2'-ethyl-1'-octenyl)-2-norbornene.

Representative examples of the copolymers within the scope of the present invention include:

Ethylene/propylene/5-(2'-butenyl)-2-norbornene;
Ethylene/propylene/5 - (2' - ethyl - 2' - butenyl)-2-norbornene;
Ethylene/propylene/5 - (2' - ethyl - 1' - butenyl)-2-norbornene;
Ethylene/propylene/5-(1'-propenyl)-2-norbornene;
Ethylene/1-butene/5-(2'-heptyl - 1' - undecenyl)-2-norbornene;
Ethylene/1-butene/5-(2'-butenyl)-2-norbornene;
Ethylene/1 - butene/5-(2'-ethyl - 2' - butenyl)-2-norbornene;
Ethylene/4,4-dimethyl - 1 - hexene/5-(2'-propyl-2'-pentenyl)-2-norbornene;
Ethylene/5,5-dimethyl-1-octene/5-(2'-nonyl-2'-heptenyl)-2-norbornene;
Ethylene/6-methyl - 1 - heptene/5-(2'-methyl-2-decenyl)-2-norbornene;
Ethylene/1-decene/5-(2'-hexyl-2'-butenyl)-2-norbornene; and,
Ethylene/5,6,6-trimethyl - 1 - heptene/5-(2'-octyl-2'-butenyl)-2-norbornene.

The ethylene monomer unit concentration ranges in general from about 20% to about 72.5% by weight. Copolymers having more ethylene monomer units tend to be stiff and non-elastomeric. The concentration of $R-CH=CH_2$ monomer units ranges in general from about 25% to about 77.5% by weight. Copolymers having a higher propylene content are known to be leathery and boardy.

The 5-alkenyl-2-norbornene diolefin monomer units should be present in sufficient amount to provide for sulfur curability i.e.—at least about 0.03 gram-moles per 100 grams of elastomer—while the maximum amount present by weight should be such as not to interfere seriously with the elastic character of the product—i.e. not over about 20% by weight.

As another indication of adequate curability, the iodine number of the copolymer should be at least 5. The iodine number is a measure of the total unsaturation of the polymer and this unsaturation arises from two sources (1) the alkenyl radical of the 5-alkenyl-2-norbornene and (2) the terminal groups of the polymer chain which, based on infrared evidence, have a double bond of the vinylidene type:

Iodine numbers in excess of about 60 are undesirable in that values higher than this are not needed for curability and may indicate the presence of excessive amounts of diene component.

The coordination catalyst used in preparing the copolymers of this invention is made by mixing vanadium tetrachloride or vanadium oxytrichloride (also called vanadyl chloride) with a reducing compound having the structure

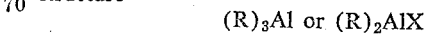

where R is $C_1$—$C_{12}$ alkyl (such as ethyl, isobutyl, octyl, or dodecyl) and X is a chlorine atom or a bromine atom; the preferred organoaluminum compound is aluminum triisobutyl. The relative proportions of the vanadium salt and the organoaluminum compound may be varied so that the value of the molar ratio of aluminum to vanadium ranges between about 1:1 to 10:1. The preferred concentration of the vanadium salt in the copolymerization reaction zone is about $5 \times 10^{-4}$ to $5 \times 10^{-3}$ moles/liter; however, higher or lower concentrations can be employed. The catalyst may be premixed or it may be formed in situ in the reaction zone.

The preferred solvent is tetrachloroethylene. Liquid paraffins and cycloparaffins such as neopentane, isopentane, pentane, cyclopentane, n-hexane, cyclohexane, n-heptane, 2,2,4-trimethylpentane, methylcyclohexane, and n-octane can be used. Fluorochloro substituted liquid paraffins are also suitable, as for example, trichlorofluoromethane.

In a typical procedure a glass reaction vessel, equipped with a glass agitator, gas inlet and outlet tubes and openings to permit the introduction of liquid reagents, is charged under nitrogen with tetrachloroethylene which has been purified by distillation from calcium hydride or by passage through a column of silica gel.

Agitation is started and a mixture of ethylene and propylene gases is continuously introduced through the gas-inlet tube below the liquid surface. The nitrogen inflow is discontinued. The relative amounts of ethylene and propylene in the gas feed stream are controlled by suitably calibrated rotameters which are placed in the gas feed lines ahead of the T in which the gases are mixed. Prior to their introduction into the reactor, the gases are purified from oxygen, water vapor and other contaminants reactable with aluminum triisobutyl by passage through a scrubber containing aluminum triisobutyl. After the ethylene-propylene mixture has been introduced for 3 to 5 minutes, the tetrachloroethylene is substantially saturated with each monomer. Monomer inflow is continued and excess gas is allowed to escape through the gas outlet tube through a bubble-trap filled with "Nujol," a liquid petrolatum of specific gravity 0.88–0.90 at 60° F. (available from Plough, Inc., Memphis, Tenn.), to prevent back-flow of air. 5-alkenyl-2-norbornene, aluminum triisobutyl and vanadium oxytrichloride are then added, in turn, to the tetrachloroethylene solution of ethylene and propylene by means of hypodermic needles through an opening in the reactor sealed with a soft rubber serum cap. The amount of vanadium oxytrichloride added is such that the vanadium concentration in the reaction mass is $5 \times 10^{-4}$ to $5 \times 10^{-3}$ moles/liter. Reaction occurs at once producing an intense blue-violet color, changing rapidly to pale amber. The monomers are consumed and the temperature of the charge rises. Cooling may be applied, when desired. The concentration of copolymer reaches about 1 to 5 percent by weight in about 20 to 80 minutes when the temperature of the charge ranges between 20° and 60° C. As the copolymerization proceeds, the charge becomes increasingly viscous; it is generally convenient to stop the reaction before the copolymer concentration exceeds about 5% by weight.

In operating the copolymerization process, in general, all of the diolefin may be present before the catalyst is added; alternatively, part or all of the diolefin may be added during the copolymerization; this introduction may be continuous, or intermittent.

The catalyst is deactivated by introduction of a low molecular weight alcohol to the reaction mass; representative reagents are isopropanol and n-butanol. The copolymer solution is then extracted with dilute (5–10%) hydrochloric acid, washed with water until acid-free, and introduced onto a hot rotating drum; the solvent is flashed off, leaving a band of copolymer which is subsequently scraped from the drum by a doctor knife; alternatively, the solvent may be evaporated and the copolymer subsequently dried by milling on a rubber roll mill. An antioxidant, such as 2,2'-methylene-bis(6-tert-butyl-4-methylphenol) or 4,4'-thiobis(2-tert-butyl-5-methylphenol), is incorporated prior to the drying operation to avoid possible oxidation and degradation of the copolymer.

The novel copolymers of this invention are rubbery in nature and may be cured to form highly useful elastomers. Any one of a wide variety of curing procedures may be employed. As has been mentioned above, the copolymers may be readily cured with sulfur. Any of the procedures familiar to those skilled in the processing of natural rubber, butadiene-styrene rubber (SBR), and butyl rubber are suitable.

Various procedures and modifications of sulfur curing are described in Encyclopedia of Chemical Technology, Kirk and Orthmer, published by Interscience Encyclopedia, Inc., New York, 1953, vol. 11, pages 892–927; Principles of High-Polymer Theory and Practice, Schmidt and Marlies, published by McGraw-Hill Book Co., Inc., New York, 1948, pages 556–566; and Chemistry and Technology of Rubber, Davis and Blake, published by Reinhold Publishing Corporation, New York, 1937, chapter VI. Typical procedures are illustrated in the examples which follow.

In place of sulfur curing, which is preferred, one may employ a free radical cure.

In carrying out a free radical cure of the copolymers, it is merely necessary to mix, by standard procedures, a free radical generator with the copolymer and to heat until a cure is obtained. The temperature range may vary within wide limits, depending upon the particular free radical generator being used. However, heating to temperatures of about 50°–175° C. for a period of 30 minutes to several hours is ordinarily adequate. Longer times may be used in the case of the more thermally stable free radical generators.

The preferred free radical generators which may be incorporated with the copolymers are organic peroxides. Representative examples are bis(alpha,alpha-dimethylbenzyl) peroxide, dibenzoyl peroxide, di-tert-butyl peroxide, cumene hydroperoxide, methyl ethyl ketone peroxide, tert-butyl perbenzoate and di-N-methyl tert-butyl percarbamate. Bis(alpha,alpha-dimethylbenzyl) peroxide, often called dicumyl peroxide, is particularly preferred. About 2.5 to 3 parts by weight is used for every 100 parts by weight of the copolymer. The compounded stock is then cured at about 150° C. for about 30 to 60 minutes.

In addition to the free radical generator, a free radical acceptor may be present such as N-substituted maleimide, an N,N'-substituted bismaleimide, an N,N'-substituted bisacrylamide, a cyclic triacryloylhexahydrotriazine, or mixtures thereof. The quantity of free radical acceptor may range from about 0.5% to 6% by weight of the copolymer. The weight of the free radical acceptor may be less, equal to, or more than the weight of the free radical generator.

The maleimides are compounds having the formula:

wherein R is an alkyl or an aryl radical. Representative maleimides include compounds such as N-methylmaleimide, N-phenyl maleimide and N-pyrenyl maleimide. The bismaleimides may be represented by the formula:

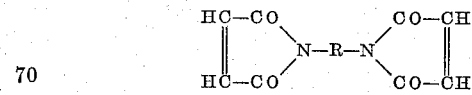

wherein R is an alkylene or an arylene radical. Representative bismaleimides include N,N'-ethylene bismaleimide, N,N'-phenylene bismaleimide and N,N'-pyrenylene bismaleimide. The bisacrylamides which may be used in the process of the present invention may be represented by the formula:

CH₂=CH—CO—NH—R—NH—CO—CH=CH₂ wherein R is an alkylene or an arylene radical. Representative compounds include methylene bisacrylamide and phenylene bisacrylamide.

A wide variety of compounding agents may be incorporated with these copolymers at the time they are cured in order to improve various properties. Thus, they may be loaded with carbon black in order to increase the tensile strength. Other compounding agents include titanium dioxide and silica.

The copolymers of this invention have many varied uses. They may be employed in the preparation of tires, inner tubes, belts, hose and tubing, wire and cable jackets, footwear, sponges, coated fabrics, and a wide variety of coated or molded articles. They are characterized by good thermal stability and excellent resistance to ozone. The uncured but compounded copolymers are not affected by moisture but can be stored for lengthy periods before shaping and vulcanizing.

The copolymers of the present invention can be prepared by a continuous process at atmospheric or superatmospheric pressure.

Thus, solvent, monomers and catalyst may be introduced continuously into a polymerization zone at such a rate as to provide a residence time sufficient to build up the desired concentration of copolymer in the polymerization mass. The residence time may vary widely, from, say, 10 minutes to several hours or more. In general, the residence time will be shorter as the concentrations of monomers and catalysts in the feed stream are increased.

The copolymer solution which continually overflows from the polymerization zone is contacted in a subsequent zone with a catalyst deactivator; the copolymer is ultimately continually obtained after suitable continuous purification and isolation procedures.

Representative examples illustrating the present invention are as follows.

EXAMPLE 1

*Part A.—Preparation of 5-Bromomethyl-2-Norbornene Grignard Reagent*

A 500-cc. 4-necked glass flask was fitted with a "Teflon" TFE-Fluorocarbon Resin stirrer, condenser, thermometer, addition funnel, and nitrogen inlet. The flask was heated to drive out moisture while a sweep of dry nitrogen was passed through. Magnesium turnings (12.2 grams, 0.50 mole) and anhydrous ether were placed in the flask and stirring was started. A solution of 5-bromoethyl-2-norbornene (93.6 grams, 0.50 mole) in anhydrous ether was added, dropwise, to the flask over a period of 50 minutes. A crystal of iodine was then introduced. After the mixture had been subsequently warmed and a magnesium particle had been crushed therein, a vigorous reaction ensued. The color of the mixture became dark gray as the magnesium dissolved. Steady refluxing at 40° C. was maintained for 35 minutes after completion of the 5-bromomethyl-2-norbornene addition. More ether (100 cc.) was added. About 1–2 grams of magnesium remained undissolved.

*Part B.—Preparation of 5-(2'-Ethyl-2'-Hydroxybutyl)-2-Norbornene*

A solution of diethyl ketone (also called 3-pentanone) (43.1 grams, 0.50 mole) in anhydrous ether (50 cc.) was added, dropwise, over a 27-minute period to the mixture prepared in Part A above. No color change was noted, but vigorous ether evaporation occurred at first; the reaction slowed down very soon afterward. The steadily refluxing mixture was stirred for 17 hours, cooled, and filtered free from residual magnesium and gray powder. Addition of 3 N acetic acid (100 cc.) caused the precipitation of a white salt (magnesium bromoacetate) which was subsequently dissolved by introduction of water. The two liquid layers were separated and the aqueous layer was extracted with more ether. The combined ethereal layers were washed, in turn, with aqueous sodium bicarbonate solution (10%) and water. After the ether layer had been dried over anhydrous sodium sulfate, the ether was distilled off at atmospheric pressure. The residue was fractionally distilled in vacuo to give 31.5 grams of an oil boiling at 78–82° C. (2 mm. Hg) and exhibiting a refractive index of 1.4905 (at 25° C.) and a strong infrared band at 2.9 microns characteristic of a hydroxyl group.

Calcd. for $C_{13}H_{22}O$: C, 80.4; H, 11.4. Found: C, 80.0; H, 11.4.

*Part C.—Preparation of 5-(2'-Ethyl-1' or 2'-Butenyl)-2-Norbornene*

5-(2'-ethyl-2'-hydroxybutyl)-2-norbornene (28.4 grams, 0.146 mole) prepared in Part B above, dry toluene (15 milliliters), and anhydrous copper sulfate (1.0 gram) were heated to reflux in a 100 milliliter round-bottom glass flask equipped with an agitator and a Dean-Stark tube fitted at the top with a condenser. Toluene and water azeotroped over as a cloudy suspension. This distillate was withdrawn periodically; more toluene was subsequently added to the flask each time. After 4 hours the pot temperature had reached 220° C. and only clear distillate was appearing. The heat was shut off and the brown pot residue was cooled to about 50° C., filtered, and distilled in vacuo. The 5-(2'-ethyl-1' or 2'-butenyl)-2-norbornene (15.2 grams, 0.0861 mole) was obtained as a very pale yellow oil, B.P. 54–56° C. (2.5 mm. Hg), refractive index (22.8° C.) of 1.4868.

Calcd. for $C_{13}H_{20}$: C, 88.5; H, 11.5. Found: C, 88.6, 88.4; H, 11.6, 11.5.

This 2-norbornene product exhibited infrared absorption at 3.3, 3.4 microns (C—H of $CH_3$, $CH_2$); 6.0, 6.15, 6.35 (C=C); 6.8 ($CH_3$—C, $CH_2$); 7.5

$$\left(-\overset{|}{\underset{|}{C}}-H\right)$$

7.3, 14.0 (cis CH=CH); 12.1

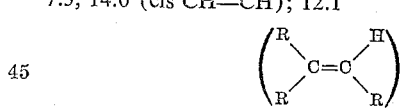

*Part D.—Preparation of Ethylene/Propylene/5-(2'-Ethyl-1' or 2'-Butenyl)-Norbornene Copolymer*

All apparatus except the hose connections and the traps for holding the aluminum triisobutyl was flame-dried while being swept with nitrogen; thereafter, a constant nitrogen sweep was supplied until introduction of the gaseous monomers; this operation was carried out to prevent contamination by atmospheric oxygen and water vapor.

A one-liter glass resin flask fitted with a glass paddle agitator, a thermometer, gas inlet and outlet tubes, and an opening to permit the introduction of liquid reagents, was charged under nitrogen at room temperature with 993 milliliters of silica-gel-purified nitrogen-sparged tetrachloroethylene. Agitation was begun. A gaseous monomer mixture was then introduced through the gas inlet tube below the tetrachloroethylene surface to supply ethylene and propylene at the respective rates of 1,000 cc./minute and 2,300 cc./minute (molar proportions 1:2.3). The relative amounts of the monomers in this feed stream were controlled by suitably calibrated rotameters which were placed in the individual monomer feed lines ahead of the T in which the gases were mixed. Before it entered the resin flask, the mixture passed, in turn, through a column packed with silica gel, a column packed with sodium hydroxide supported on asbestos, 2 traps filled with aluminum triisobutyl, and a trap filled with a liquid petrolatum of specific gravity 0.88–0.90 (at 60° F.) available from Plough, Inc., Memphis, Tenn. as "Nujol." The tetrachloroethylene in the resin flask became saturated with ethylene and propylene. Excess gas was allowed to escape through the gas outlet tube into a bubble-trap filled with "Nujol" to prevent backflow of air into the resin flask.

After the monomer gas mixture had been fed for about 5 minutes, flame-dried nitrogen-flushed syringes were used to introduce, in turn, 3.5 grams (0.02 mole) of 5-(2'-ethyl-1' or 2'-butenyl)-2-norbornene, 2 milliliters (0.002 mole) of a tetrachloroethylene solution 1.0 molar in aluminum triisobutyl, and 0.9 milliliter (0.00108 mole) of a tetrachloroethylene solution 1.2 molar in vanadium oxytrichloride into the resin flask. The color of the contents of the resin flask changed from violet to pale amber, monomer gases were absorbed rapidly for about one minute; the rate then fell off and some insoluble polymer formed. One milliliter more of the aluminum triisobutyl solution was injected. Gas absorption became quite rapid again and the temperature rose to a maximum of 45° C.

After 40 minutes the reaction mixture was deactivated by the addition of 10 milliliters of n-butanol to the reaction mixture. Monomer gas inflow was stopped. A nitrogen sweep was again provided. After the reaction mixture had been filtered through cheese cloth, the filtrate was acid-washed three times with 10% hydrochloric acid and then washed acid-free with two volumes of water. After the organic layer had been allowed to stand overnight at room temperature, the slab obtained was dried on a rubber roll mill (0.1% by weight 4,4'-thiobis(2-tert-butyl-5-methyl phenol) antioxidant added) to give 19.7 grams of a rubbery copolymer exhibiting an iodine number of 33, and containing, by weight, about 39% propylene units.

*Part E.*—The procedure of part D above was repeated except that 0.02 mole of dicyclopentadiene was substituted for the 0.02 mole of 5-(2'-ethyl-1' or 2'-butenyl)-2-norborene. The maximum temperature attained during the copolymerization was 49° C. 24.5 grams of a rubbery copolymer was obtained exhibiting an iodine number of 21.6. It contained, by weight, about 49% propylene units.

*Part E.—Curing the Copolymers*

The copolymers prepared in parts D and E above were compounded on a rubber roll mill according to the following recipe: copolymer, 10.0 grams; N-phenyl-beta-naphthylamine, 0.10 gram; high abrasion furnace black, 4 grams; zinc oxide, 0.50 gram; stearic acid, 0.10 gram; tellurium diethyl dithiocarbamate, 0.10 gram; tetramethylthiuram disulfide, 0.1 gram; 2-mercaptobenzothiazole, 0.05 gram; sulfur, 0.15 gram. The stocks obtained were heated at 150° C. for one hour in a mold to give cured rubbery slabs (5" x 1" x 0.06–0.08") which were subsequently cut into ¼" strips. They were tested with an "Instron" machine (load 50 lbs., head speed 20 in./min.). The vulcanizate of the copolymer made in part D displayed the following properties at 25° C.: modulus at 300% extension, 1970 lb./sq. in.; tensile strength, 2160 lb./sq. in.; extension at the break, 350%. The control made in Part E (containing dicyclopentadiene units) displayed a modulus at 300% extension of only 1250 lb./sq. in.

EXAMPLE 2

*Part A.—Preparation of 5-(2'-Butenyl)-2-Norbornene*

Dicyclopentadiene (52.9 grams, 0.40 mole), 1,4-hexadiene (65.7 grams, 0.80 mole), N-phenyl-beta-naphthylamine (1.0 gram), and phenothiazine (1.0 gram) were placed in a 400-cc. steel bomb which had been cooled to −78° in crushed solid carbon dioxide. The bomb was then closed, heated to 175° C. over a 60-minute period, and shaken at 175° C. for 4 hours. It was cooled to room temperature overnight and opened. After the reaction mixture had been collected, the bomb was rinsed with acetone, the rinsings were combined with the reaction mixture and the entire mixture was fractionally distilled. 5-(2'-butenyl)-2-norbornene was obtained (10.3 grams, 0.0695 mole) as a liquid, B.P. 34–36° C. (3 mm. Hg), having a refractive index (at 24° C.) of 1.4825. Calcd. for $C_{11}H_{16}$: C, 89.1; H, 10.9. Found: C, 88.9, 89.5; H, 10.9.

*Part B.—Preparation of Ethylene/Propylene/5-(2'-Butenyl)-2-Norbornene Copolymer*

992 milliliters of tetrachloroethylene was saturated with an ethylene/propylene gas mixture for 5 minutes according to the procedure of part D of Example 1 above. 2.2 grams (0.015 mole) of 5-(2'-butenyl)-2-norbornene, 4.0 milliliters (0.004 mole) of a tetrachloroethylene solution 1.0 molar in aluminum triisobutyl, and 1.0 milliliter (0.0012 mole) of a tetrachloroethylene solution 1.2 molar in vanadium oxytrichloride, in turn, were injected into the agitated monomer solution. No gas absorption occurred. A second addition of 4.0 milliliters of the aluminum triisobutyl solution and 1.0 milliliter of the vanadium oxytrichloride solution caused the copolymerization to start. The temperature rose to a maximum of 46° C. After one hour, reaction was stopped and the mixture was worked up according to the procedure of part D of Example 2 above. 23.7 grams of copolymer was obtained exhibiting an iodine number of 17.6 and containing, by weight, about 50% propylene units.

*Part C.—Preparation of Ethylene/Propylene/Dicyclopentadiene Copolymer*

The procedure of part B above was repeated except: 0.015 mole of dicyclopentadiene was substituted for 0.015 mole of 5-(2'-butenyl)-2-norbornene; the catalyst concentration was halved; the reaction time was 65 minutes instead of 60 minutes. The copolymer obtained (25.6 grams) exhibited an iodine number of 17 and contained by weight, about 53% propylene units. It had an intrinsic viscosity (in tetrachloroethylene at 30° C.) of 1.80.

*Part D.—Curing the Copolymers*

The copolymers prepared according to the procedure of parts B and C above were compounded at 20° C. on a rubber roll mill by the following recipe: copolymer, 10.0 grams; superabrasion furnace black, 4 grams; zinc oxide, 0.50 gram; stearic acid, 0.10 gram; tellurium diethyl dithiocarbamate, 0.15 gram; tetramethyl thiuram disulfide, 0.075 gram; 0.10 gram of N-phenyl-beta-naphthylamine; and 0.20 gram of sulfur. The stocks obtained were heated in a mold at 150° C. for 1 hour to give cured rubbery slabs 5" x 1" x 0.06–0.08" which were cut into ¼" strips for testing. Stress-strain properties were subsequently determined with an "Instron" machine (load 50 lbs., head speed 20 inches/min.). The vulcanizate of the copolymer prepared in Part B displayed the following properties at 25° C.: modulus at 300% extension, 1840 lb./sq. in.; tensile strength, 1890 lb./sq. in.; extension at the break, 310%. In contrast thereto, the control vulcanizate (containing dicyclopentadiene units) exhibited a modulus at 300% extension of only 970 lb./sq. in.

EXAMPLE 3

*Part A.—Preparation of 5-(1'-Propenyl)-2-Norbornene*

Freshly distilled piperylene

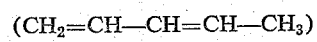

$(CH_2=CH-CH=CH-CH_3)$ was kept at 0° C. until ready for use.

Dicyclopentadiene (redistilled, 66.1 grams, 0.5 mole), piperylene (68.1 grams, 1.0 mole) and hydroquinone (1.0 gram) were placed in a 400-cc. steel bomb. The bomb was sealed, heated to 175° C. over a 42-minute period, and shaken at 175° C. for 4 hours during which period the pressure fell from an initial value of 190 p.s.i. to 100 p.s.i. The bomb was cooled to room temperature overnight and the contents were removed by vacuum.

The bomb was then rinsed with acetone and the rinsings were combined with the product. Fractional distillation gave 49.8 grams (0.371 mole) of an isomer mixture containing 5-(1'-propenyl)-2-norbornene as an oil, B.P. 25–33° C. (3 mm. Hg) having a refractive index (at 21.5° C.) of 1.4899–1.4956 and exhibiting strong infrared absorption at 10.34 and 11.0 microns typical of a trans CH=CH group.

*Analysis.*—Calcd. for $C_{10}H_{14}$: C, 89.5; H, 10.5. Found: C, 89.6; H, 10.3.

*Part B.—Preparation of Ethylene/Propylene/5-(1'-Propenyl)-2-Norbornene Copolymer*

A mixture of ethylene and propylene was introduced into 993 milliliters of tetrachloroethylene at 32° C. according to the procedure of part D of Example 1 above. After 3 minutes 2.0 grams (0.015 mole) of the diolefin mixture prepared in part A above, 1 milliliter (0.0012 mole) of a tetrachloroethylene solution 1.2 molar in vanadium oxytrichloride, and 4 milliliters (0.004 mole) of a tetrachloroethylene solution 1.0 molar in aluminum triisobutyl, in turn, were injected from nitrogen-flushed syringe into the reaction flask (through the rubber serum cap). Very slow gas absorption occurred and the temperature rose to 37° C. After 2 minutes another milliliter of the aluminum triisobutyl solution was added. Rapid gas absorption occurred and the color of the reaction mixture changed from purple to pale amber. After 3 minutes gas absorption slowed. Addition of one milliliter each of the vanadium oxytrichloride and the aluminum triisobutyl aluminum solutions, in turn, caused resumption of rapid gas uptake. After the temperature had risen to a maximum of 54° C., an ice bath was used to cool the reaction flask for 8 minutes. The viscous mixture was kept at 45° C. thereafter. After one hour reaction time the catalyst was deactivated by addition of 20 milliliters of n-butanol. The copolymer product was subsequently isolated by the same procedure used in part D of Example 1. 30.1 grams of product was obtained exhibiting an iodine number of 13.3 and containing, by weight, about 51% propylene units.

*Part C.—Curing the Copolymer*

The copolymers prepared according to the procedures of part B above and part C of Example 2 above were compounded according to the recipe of part D of Example 2 above and heated in a slab mold for 20 and 60-minute periods. The cured 5 x 1 x 0.06–0.08″ vulcanizates were cut into ¼″ strips and tested according to the procedure of part D of Example 2 above. The 20-minute vulcanizate of the copolymer of part B above displayed the following properties at 25° C.: modulus at 300% extension, 820 lb./sq. in.; tensile strength, 1140 lb./sq. in.; extension at the break, 440%. In contrast thereto, the control (containing dicyclopentadiene units) exhibited a modulus at 300% extension at 25° C. of only 540 lb./sq. in. After a 60-minute cure, the vulcanizate of the copolymer of part B above exhibited the following properties at 25° C.: modulus at 300% extension, 1020 lb./sq. in.; tensile strength, 1260 lb./sq. in.; extension at the break, 380%. The control's modulus at 300% extension at 25° C. was 970 lb./sq. in.

EXAMPLE 4

*Part A.—Preparation of Ethylene/Propylene/5-(2'-Ethyl-1' or 2'-Butenyl)-2-Norbornene Copolymer)*

The procedure of part D of Example 1 was followed except that: 989 milliliters of tetrachloroethylene was used; 7.1 grams (0.04 mole) of 5-(2'-ethyl-1' or 2'-butenyl)-2-norbornene, 0.9 milliliter (0.0011 mole) of the vanadium oxytrichloride solution, and 2 milliliters (0.002 mole) of the aluminum triisobutyl solution were initially injected; an additional 2 milliliters (0.002 mole) of the aluminum triisobutyl solution was introduced later; the reaction time was 50 minutes. 25.7 grams of copolymer was isolated exhibiting an iodine number of 58 and an intrinsic viscosity of 2.21 (at 30° C. in tetrachloroethylene). It contained, by weight, about 36% propylene units.

*Part B.—Preparation of Ethylene/Propylene/5-(2'-Butenyl)-2-Norbornene Copolymer*

991 milliliters of tetrachloroethylene was saturated with an ethylene/propylene gas mixture for 5 minutes according to the procedure of part D of Example 1 above. 5.9 grams (0.04 mole) of 5-(2'-butenyl)-2-norbornene, 0.9 milliliter of a tetrachloroethylene solution 1.2 molar in vanadium oxytrichloride, and 2.0 milliliters of a tetrachloroethylene solution 1.0 molar in aluminum triisobutyl, in turn, were injected into the agitated monomer solution at room temperature (25° C.). No gas absorption occurred. A total of 1.9 milliliters of the vanadium oxytrichloride solution and 9 milliliters of the aluminum triisobutyl solution was finally added before the reaction would occur steadily. The aluminum and vanadium concentrations then were 0.009 and 0.0023 molar, respectively. During the following 60 minutes the temperature rose to 55° C. Then 10 milliliters of n-butanol (containing a trace of 2,2'-methylenebis(6-tert-butyl-4-methyl phenol) was introduced to deactivate the catalyst. The reaction mixture was worked up according to the procedure of part D of Example 1 above. 37.3 grams of copolymer was obtained which exhibited an iodine number of 28 and an intrinsic viscosity of 1.72 (at 30° C. in tetrachloroethylene). The rubbery solid contained, by weight, about 53.5% propylene units.

*Part C.—Curing the Copolymers*

The copolymers prepared in parts A and B above were cured and tested according to the procedure of part E of Example 1 above. Table I below gives the results obtained.

TABLE I

| Diolefin used in copolymer | Vulcanizate properties at 25° C. | | |
|---|---|---|---|
| | $M_{300}$ (lb./sq. in.) | $T_B$ (lb./sq. in.) | $E_B$ (percent) |
| 5-(2'-ethyl-1' or 2'-butenyl)-2-norbornene | 1,470 | 1,970 | 270 |
| 5-(2'-butenyl)-2-Norbornene | 1,350 | 1,420 | 210 |

It is to be understood that one may substitute any of the heretofore described specie alpha olefins, and mixtures thereof, said alpha olefins having the structure R—CH=CH$_2$, in the preceding examples to give substantially the same results. R in this monoolefin is a $C_1$–$C_8$ alkyl radical.

It is also understood that any of the heretofore described 5-alkenyl-2-norbornenes may be substituted in any of the preceding examples to give substantially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A sulfur-curable copolymer of ethylene, at least 1 alpha olefin having the structure R—CH=CH$_2$ wherein R is a $C_1$–$C_8$ alkyl radical, and 5-alkenyl-2-norbornene, said alkenyl radical having from 3 to 18 carbon atoms, the carbon to carbon double bond of said radical being internal, said copolymer having an iodine number between 5 and 60, and, said copolymer containing at least about 20% ethylene units by weight, at least 25% of said alpha olefin units by weight, and, at least about 0.03 gram-moles per 100 grams of said copolymer and not over about 20% by weight of said copolymer of said 5-alkenyl-2-norbornene.

2. A sulfur-curable copolymer of ethylene, at least 1 alpha-olefin having the structure R—CH=CH$_2$ wherein R is a C$_1$—C$_8$ alkyl radical, and 5-alkenyl-2-norbornene, said copolymer containing at least about 20% ethylene units by weight, at least 25% of said alpha-olefin units by weight, and at least about 0.03 gram-moles per 100 grams of said copolymer and not over 20% by weight of said copolymer of said 5-alkenyl-2-norbornene.

3. A cured elastomer obtained by curing the copolymer of claim 2 with sulfur.

4. A copolymer according to claim 2 wherein the alpha-olefin having the structure R—CH=CH$_2$ is propylene.

5. A copolymer according to claim 4 wherein the norbornene is 5-(1'-propenyl)-2-norbornene.

6. A copolymer according to claim 4 wherein the norbornene is 5-(2'-butenyl)-2-norbornene.

7. A copolymer according to claim 4 wherein the norbornene is 5-(2'-ethylbutenyl)-2-norbornene.

8. A copolymer according to claim 2 wherein the alpha-olefin having the structure R—CH=CH$_2$ is 1-butene.

9. A copolymer according to claim 8 wherein the norbornene is 5-(2'-butenyl)-2-norbornene.

10. A copolymer according to claim 8 wherein the norbornene is 5-(2'-ethyl-2'-butenyl)-2-norbornene.

11. A cured elastomer obtained by curing the copolymer of claim 1 with sulfur.

References Cited in the file of this patent

UNITED STATES PATENTS

| | | |
|---|---|---|
| 2,373,706 | Ott | Apr. 17, 1945 |
| 2,752,403 | Schutze et al. | June 26, 1956 |
| 2,868,772 | Ray et al. | Jan. 13, 1959 |